United States Patent [19]
Gasch et al.

[11] Patent Number: 5,533,400
[45] Date of Patent: Jul. 9, 1996

[54] PROCESS FOR THE EARLY DETECTION OF A CRACK IN A ROTATING SHAFT

[75] Inventors: Robert Gasch, Berlin, Germany; Mingfu Liao, Xian, China

[73] Assignee: Carl Schenck AG, Germany

[21] Appl. No.: 117,918

[22] Filed: Sep. 9, 1993

[30] Foreign Application Priority Data

Sep. 4, 1992 [DE] Germany .................. 42 29 340

[51] Int. Cl.[6] ........................................ G01H 1/00
[52] U.S. Cl. ................................ 73/593; 73/660
[58] Field of Search .................. 73/587, 593, 602, 73/660, 659; 364/507

[56] References Cited

U.S. PATENT DOCUMENTS

| | | | |
|---|---|---|---|
| 4,380,172 | 4/1983 | Umam et al. | 73/659 |
| 4,464,935 | 8/1984 | McHugh | 73/660 |
| 4,751,657 | 6/1988 | Imam | 364/507 |
| 5,086,775 | 2/1992 | Parker | 73/653 |
| 5,099,848 | 3/1992 | Parker | 73/575 |

FOREIGN PATENT DOCUMENTS 4012278  10/1990  Germany .
4110110  10/1991  Germany .

OTHER PUBLICATIONS

Fertigungsmebtechnik, Wolfgang Dutschke, B. G. Teubner Stuttgart 1990,S.93; 4Abs. von untern.
ShaftCrack Detection, Methodology 1988, 16 Seiten Firmenschrift der Bently Nevada Corp. Minden/Nevada.

Primary Examiner—Hezron E. Williams
Assistant Examiner—Christine K. Oda
Attorney, Agent, or Firm—Connolly & Hutz

[57] ABSTRACT

The present invention relates to a process for the early detection of a crack in a rotating shaft, particularly in a shaft of a turbo generator used in a power plant. Signals that represent flexural vibrations of the shaft are measured—as a function of the rotational angle, continuously or at time intervals by means of vibration sensors in at least two radial, preferably perpendicular, directions with respect to each other. These signals are transmitted to a signal processor which uses the signals to ascertain the harmonic vibration components with single and/or double and/or triple rotational frequencies and then the processor forms single and/or double and/or triple rotational-frequent vibration orbits by means of a vectorial combination of these vibration components.

2 Claims, 2 Drawing Sheets

PROCESS FOR THE EARLY DETECTION OF A CRACK IN A ROTATING SHAFT

BACKGROUND OF THE INVENTION

The present invention relates to a process for detecting cracks in rotating shafts.

The early detection of a crack in a shaft is particularly important in the case of large machines of the type used in power plants since this prevents damage to such machines as well as the associated costs and the risks. Since these machines are often in continuous operation for prolonged periods of time and since it is not economically feasible to temporarily take them out of operation, processes have already been developed in which, by means of continuous monitoring and analysis of the flexural vibrations in the shaft, an attempt is made to detect the presence of a crack in the shaft on the basis of certain changes in the vibration.

Thus, U.S. Pat. No. 4,380,172 discloses a process for determining cracks in a turbine rotor in which the vibrations of the rotor are picked up and evaluated during the operation of the turbine under load as well as at an essentially normal operating speed. For this purpose, there are vibration sensors positioned at 90° with respect to each other along the circumference of the bearings, and these sensors can be designed as displacement or acceleration pick-ups. These vibration signals are first picked up when the turbine is in its normal operation, processed and then the harmonic components of the vibration signals are determined by means of signal analyses. As a result, the vibration components appear with single, double and triple rotational frequencies. In order to detect cracks as soon as possible on the basis of an evaluation of these vibration components, the temperature of the turbine rotor is changed, for example, by means of an appropriate regulation of the steam temperature, as a result of which thermal stresses are temporarily created in the rotor which, in turn, influence the crack-related vibration behavior of the rotor. The existence of a crack is ascertained by comparing the vibration signals picked up and analyzed before and after the temperature change, and particularly by observing the change of their two-fold rotational-frequent components. The known process, however, has proven to be insufficiently informative since unbalance, alignment errors, bearing damage and innumerable other influences can give rise to vibration phenomena which are similar to the vibration phenomena due to a crack. Field experiments have showed that the evidence of a crack can be hidden by the simultaneous occurrence of various disturbances. It was also observed that two-pole generators excite two-fold rotational-frequent vibrations in connection with rotational-frequent variations without the presence of a crack.

In order to distinguish vibration characteristics of a shaft crack from other function disturbances which result in a similar vibration behavior, it is a known process to form the kinetic shaft orbit or shaft-vibration orbit on the basis of the picked-up signals and to then represent and evaluate these signals in a polar diagram. It is also a known process to represent and evaluate the formation of vibration figures of the filtered-out vibration component with double rotational frequency. The evaluation of the vibration figures, however, calls for a number of additional analyses, as a result of which it is very complex and expensive. There are no provisions for a decomposition of the vibration figures into forward and backward whirls.

SUMMARY OF THE INVENTION

The invention is based on the objective of creating a process of the above-mentioned type for purposes of the early detection of a crack in a rotating shaft, a process which makes it possible to analyze the vibrations picked up during operation in order to clearly distinguish between vibrations stemming from a crack and vibrations resulting from other causes.

According to the invention, this objective is achieved in that the signal processor vectorially decomposes the rotational-frequent and/or double rotational-frequent and/or triple rotational-frequent vibration orbits formed on the basis of the harmonic vibration components into forward whirls turning in the same rotational direction as the shaft and into backward whirls turning in the opposite direction to the rotation of the shaft, and in that the backward whirl is compared with a base-line information ascertained in the new or normal state.

The process according to the invention is based on the knowledge that, in the ascertained vibration orbits, the tracks of forward and backward vectors overlap and these tracks are affected differently by the occurrences which excite the vibrations. In this context, it has been surprisingly found that, in addition to the forward rotational-frequent, double rotational-frequent and triple rotational-frequent vibrations, the shaft crack especially strongly excites the backward rotational-frequent vibration, which is not significantly affected by other excitation resources (unbalance, uneven shaft stiffness). By observing and comparing the rotational-frequent, double rotational-frequent or triple rotational-frequent backward whirls with an appropriate reference base-line ascertained in the new or normal state, it becomes possible to ascertain at an early point in time and with a certainty unknown until now whether a crack has formed in the shaft and the extent to which an existing crack is changing. In this manner, the process according to the invention greatly improves the resolution of the very complex contents of the measured signals when it comes to the early detection of shaft cracks.

The process according to the invention is particularly well-suited for the continuous monitoring of the state of the shaft motion of power plant machines such as turbo generators, generators, cooling water pumps and the like, all of which are operated continuously over prolonged periods of time at the same speed. Here, it is often the case that the operating speed lies in the supercritical rotational range, in which the crack-related vibration fraction is very small, especially with respect to the double- and triple-rotational vibrations, and thus difficult to detect. In order to overcome this disadvantage, another embodiment of the invention proposes that, as vibration sensors, acceleration pick-ups are positioned in one rotational plane and staggered by 90° with respect to each other along the circumference of shaft. The signals of the acceleration pick-ups are transmitted to the signal processor via a telemetric device. The arrangement of acceleration pick-ups on the shaft considerably improves the resolution of the vibration measurement, so that even smaller signals can be better resolved and crack responses can be better recognized.

BRIEF DESCRIPTION OF THE DRAWINGS

Novel features and advantages of the present invention in addition to those mentioned above will become apparent to those skilled in the art from a reading of the following detailed description in conjunction with the accompanying drawings wherein similar reference characters refer to similar parts and in which.

DETAILED DESCRIPTION OF THE INVENTION

Figure 1:
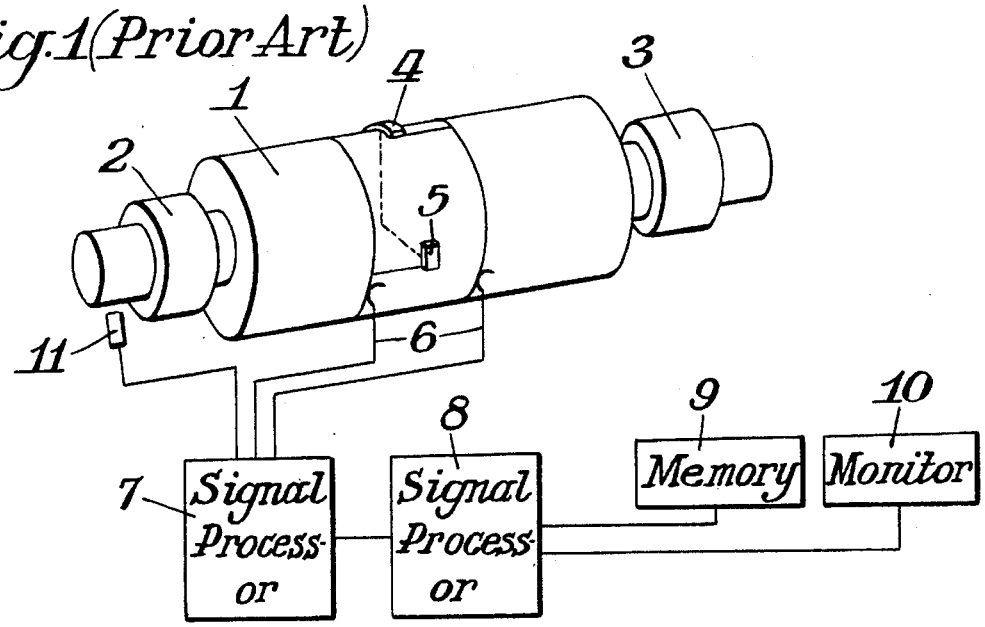
FIG. 1 is a simplified schematic view of a shaft with apparatus for carrying out the process of the present invention.

FIG. 1 shows a shaft 1 which is rotatably supported in bearings 2, 3. Attached to the shaft 1 is a phase transmitter 11 which transmits a reference signal to a signal processor 7. Piezo-electric acceleration pick-ups 4, 5 are arranged on the shaft 1 in a common rotation plane at an angle of 90° from one another. By means of a telemetric device 6, the voltage signals of the acceleration pick-ups 4, 5 are transmitted to the signal processor 7 where they are amplified and filtered in a manner suitable for further processing. The processed voltage signals are transmitted together with the signal of the phase transmitter 11 to an electronic signal processor 8 where the signals are processed in a manner more fully described below. The data obtained on the basis of the signal processor 8 can be entered into a memory 9 and displayed by means of a monitor 10.

Figure 2:
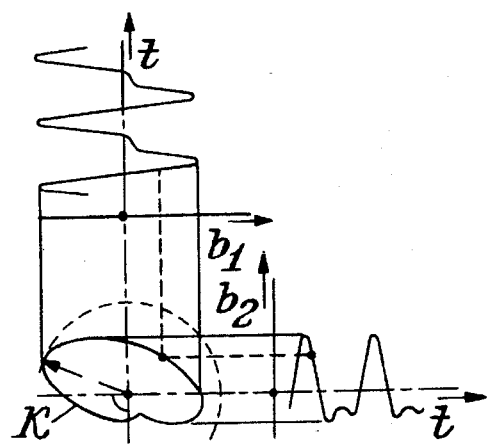
FIG. 2 is a diagrammatic view illustrating the vectorial combination of the detected vibrations forming a wave-vibration diagram.

FIG. 2 shows examples of acceleration signals $b_1$, $b_2$ as a function of time t, and, on the basis of the flexural vibrations present in shaft 1, these signals are picked up by the acceleration pick-ups 4, 5 while the shaft 1 is rotating. The acceleration signals reflect directly the vibrations of the shaft 1. The vectorial addition of signals $b_1$ and $b_2$ makes it possible to form a vibration orbit K which is traversed rotationally in the turning direction of shaft 1. Thus, vibration orbit K describes the kinetic shaft orbit traversed about the shaft mid-point at a certain operating state.

Figure 3:
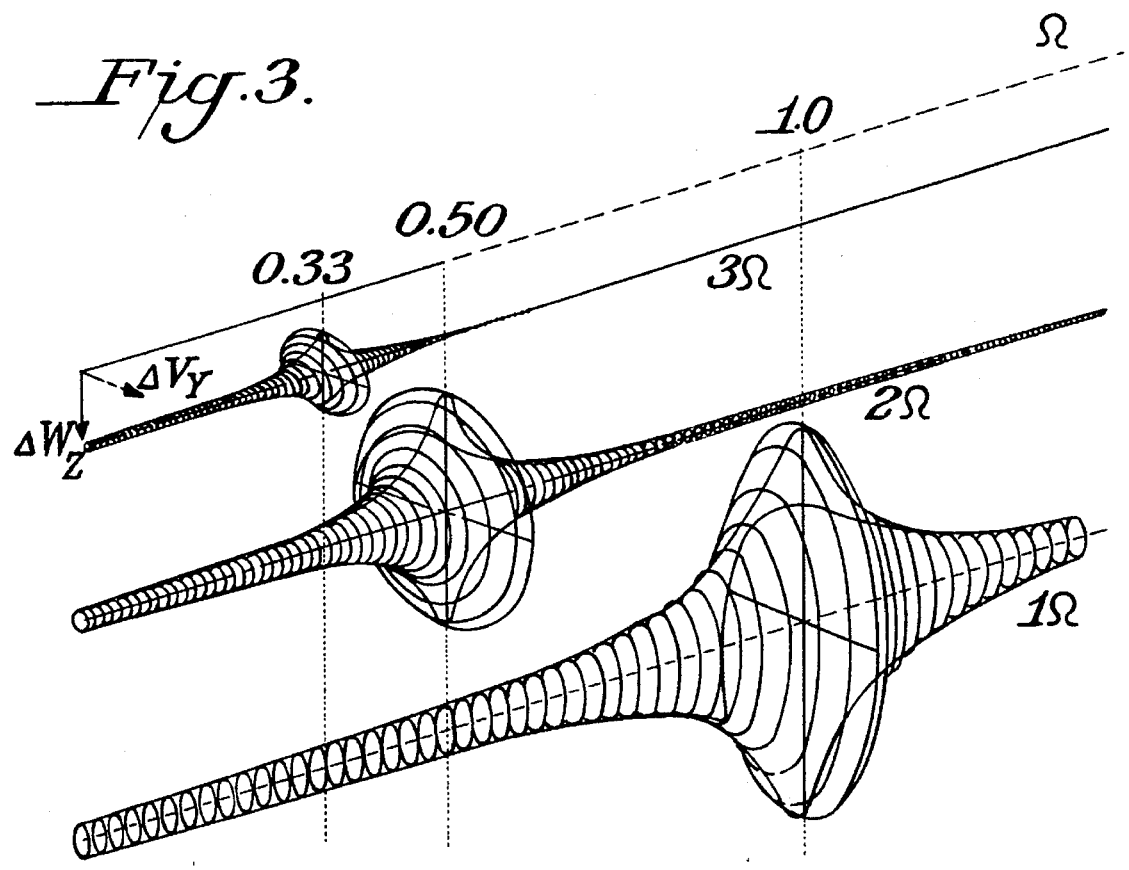
FIG. 3 is a spatial representation of circular and elliptic vibration diagrams of single, double and triple rotational frequencies as a function of shaft speed.
Figure 4:
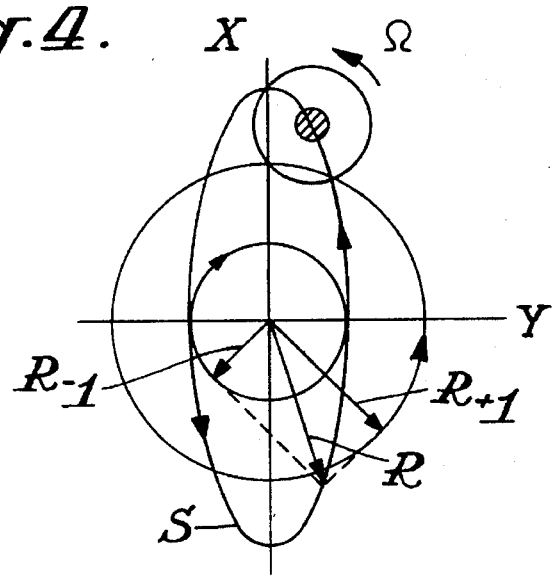
FIG. 4 is a diagrammatic view illustrating the vectorial decomposition of a vibration orbit into forward and backward whirls.

Comparable vibration orbit can also be formed by the harmonic vibration components of each measured vibration of the shaft. The diagram according to FIG. 3 shows examples of vibration orbits of single, double and triple rotational-frequent harmonic vibration components over the shaft speed $\Omega$. In this context, the speed $\Omega$ is expressed as the ratio of the absolute speed to the critical speed. The representation shows that the rotational-frequent vibration has its greatest amplitude at the critical speed, while the double rotational-frequent vibration has its greatest amplitude at half the critical speed. The triple rotational-frequent vibration has its greatest amplitude at one-third of the critical speed. If the operating state lies in the supercritical range, there are very small amplitudes and correspondingly small signals, especially for the harmonic vibration components with double and triple rotational frequencies. In accordance with the process according to the invention, vibration orbits corresponding to the representation in FIG. 3 are formed by means of the analysis of the vibration signals picked up at the operating speed of the shaft, after which these signals are decomposed into forward whirls and backward whirls by means of vectorial decomposition. FIG. 4 shows an example of this vectorial decomposition with reference to a rotational-frequent synchronously traversed slim ellipsis of a first harmonic vibration component. The elliptic vibration orbit S originates from the superimposition of forward and backward circular whirls. The vectorial decomposition of the vector R which generates the vibration orbit S makes it possible to determine the forward whirl $R_{+1}$ and the backward whirl $R_1$. The backward whirl $R_{-1}$ is compared with a comparable reference base-line which is stored in the memory 9 and which is ascertained in an analogous manner in the normal or new state of the machine. A positive deviation is an indication of the presence of a crack in the shaft being monitored. Once a crack has been found, it is possible to track the growth of the crack according to the increase of the backward whirl.

Essentially, the rotational-frequent backward whirl of the first harmonic generally is a sufficiently clear indicator for the early detection of cracks in accordance with the process according to the invention, especially since the component's higher signal strength allows a better resolution. According to the inherent vibrational behavior of the entire rotor arrangement, the features of the disturbance vibrations which overlap the crack response and the operating speed present, it is advantageous to also observe the behavior of the backward whirls of the vibration orbits with double and triple rotational frequencies in order to obtain a more informative conclusion on the presence of a crack.

What is claimed is:

1. A process for the early detection of a crack in a rotating shaft, in which signals representative of flexural vibrations of the shaft are picked up as a function of rotational angle by means of vibration sensors in at least two radial directions, and the signals are transmitted to a signal processor which uses the signals to ascertain the harmonic vibration components with at least a single rotational frequency and then the processor forms at least a single rotational-frequent vibration orbit by means of a vectorial combination of the vibration components, the improvement comprising in that the signal processor vectorially decomposes at least the single rotational-frequent vibration orbit formed on the basis of the harmonic vibration components into a forward whirl turning in the same rotational direction as the shaft and into a backward whirl turning in the opposite direction to the rotation of the shaft and in that the backward whirl is compared with a reference base-line ascertained in one of the new and normal states.

2. A process for the early detection of a crack in a rotating shaft, in which signals representative of flexural vibrations of the shaft are picked up as a function of rotational angle by means of vibration sensors in at least two radial directions, and the signals are transmitted to a signal processor which uses the signals to ascertain the harmonic vibration components with at least a single rotational frequency and then the processor forms at least a single rotational-frequent vibration orbit by means of a vectorial combination of the vibration components, the improvement comprising in that the signal processor vectorially decomposes at least the single rotational-frequent vibration orbit formed on the basis of the harmonic vibration components into a forward whirl turning in the same rotational direction as the shaft and into a backward whirl turning in the opposite direction to the rotation of the shaft and in that the backward whirl is compared with a reference base-line ascertained in one of the new and normal states, and wherein acceleration pick-ups are utilized as the vibration sensors positioned in one rotational plane and spaced apart by 90° with respect to each other along the circumference of the shaft, and the signals of the acceleration pick-ups are transmitted to the signal processor via a telemetric device.

* * * * *